United States Patent Office 3,450,599
Patented June 17, 1969

3,450,599
PROCESS FOR PRODUCING L-GLUTAMIC ACID AND ALPHA-KETOGLUTARIC ACID
Katsunobu Tanaka and Kazuo Kimura, Machida-shi, and Ken Yamaguchi, Tokyo, Japan, assignors to Kyowa Hakko Kogyo Co., Ltd., Tokyo, Japan, a corporation of Japan
No Drawing. Continuation of application Ser. No. 481,921, Aug. 23, 1965. This application May 17, 1968, Ser. No. 729,943
Claims priority, application Japan, Aug. 24, 1964, 39/47,169
Int. Cl. C12b 1/20; C12d 13/06, 1/10
U.S. Cl. 195—28                                   25 Claims

ABSTRACT OF THE DISCLOSURE

A process for producing alpha-ketoglutaric acid and L-glutamic acid comprising,
 (a) culturing a microorganism belonging to the genus Arthrobacter,
 (b) under aerobic conditions;
 (c) in an aqueous nutrient medium containing at least one normal-paraffin as a major source of carbon; and
 (d) recovering the alpha-ketoglutaric acid and L-glutamic acid:
wherein it is preferred that:
 (e) the normal-paraffin has 11 to 18 carbon atoms;
 (f) the aqueous medium is maintained at a pH of 7.0 to 8.2 by the use of ammonia ion;
 (g) the pH is maintained by the addition of urea, ammonia or ammonium carbonate;
 (h) the aqueous nutrient medium includes a source of nitrogen, inorganic salts including at least a supply of iron ion and a source of growth promoting factors which supplies at least biotin, thiamine and vitamin $B_{12}$;
 (i) the species of Arthrobacter are *Arthrobacter simplex*, *Arthrobacter roseoparaffinus*, *Arthrobacter hydrocarboglutamicus* and *Arthrobacter paraffineus*;
 (j) the aqueous nutrient medium includes aliphatic alcohol, benzoic acid, sulfanilic acid or mixtures thereof; and
 (k) the aqueous nutrient medium includes adenine.

---

This application is a continuation application of Ser. No. 481,921 filed on Aug. 23, 1965, now abandoned.

This invention relates to the prepartion of L-glutamic acid and alpha-ketoglutaric acid. More particularly, it relates to a process for the preparation of L-glutamic acid and alpha-ketoglutaric acid by fermentation. Even more particularly, the invention relates to a process for producing L-glutamic acid and alpha-ketoglutaric acid by fermentation of a nutrient medium containing n-paraffins as the major carbon source and using microorganisms belonging to the genus Arthrobacter.

As the result of much research on strains of microorganisms which produce carboxylic acids and amino acids, especially alpha-ketoglutaric acid, citric acid and L-glutamic acid, in a culture medium with the use of normal-paraffins as the starting material, the present inventors have found certain strains which successfully achieve the desired results. For example, it has been found that large amounts of alpha-ketoglutaric acid and L-glutamic acid are accumulated in a culture medium containing the novel microorganism *Arthrobacter paraffineus*.

Although bacteria with hydrocarbon-assimilatory capacity generally produce alpha-ketoglutaric acid, the present inventors have found that microorganisms which belong to the genus Arthrobacter give an especially high productivity of alpha-ketoglutaric acid. Furthermore, under suitable conditions, almost all of the thus obtained alpha-ketoglutaric acid may be converted into L-glutamic acid.

One of the objects of the present invention is to provide a process for producing alpha-ketoglutaric acid and L-glumaric acid by a fermentation method.

Another object of the present invention is to provide a process for the preparation of alpha-ketoglutaric acid and L-glutamic acid in high yield.

Still another object of the present invention is to provide a fermentation process which allows the accumulation of remarkably large quantities of alpha-ketoglutaric acid.

Yet another object of the present invention is to provide a fermentation process for the preparation of large amounts of alpha-ketoglutaric acid which may be carried out at low cost.

And another object of the present invention is to provide a fermentation process whereby the remarkably large amounts of alpha-ketoglutaric acid produced can be converted to give high yields of L-glutamic acid, if desired.

These and other objects of the present invention will become apparent to those skilled in the art from a reading of the following specification and claims.

In accordance with the present invention, it has been found that an appropriate control of certain constituents, such as vitamins and inorganic salts, is preferred for the proper growth of bacteria belonging to the genus Arthrobacter in a culture medium containing n-paraffins as the carbon source and for the accumulation of large amounts of alpha-ketoglutaric acid and L-glutamic acid. Specifically, the growth of the mircoorganisms and the yield of the desired products are extremely accelerated by employing a culture medium containing at least one of the substances thiamine, vitamin $B_{12}$, para-aminobenzoic acid, biotin, their derivatives or closely related compounds thereto, and a high concentration of iron ion.

Moreover, the addition of calcium carbonate to the fermentation medium effectively greatly increases the accumulation of alpha-ketoglutaric acid. Using appropriate culture conditions, the amount of alpha-ketoglutaric acid accumulated is more than 70 grams/liter, corresponding to a yield of about 70% with respect to the amount of n-paraffin consumed.

The process of the present invention provides a fermentation yield that is remarkably high compared with the conventional alpha-ketoglutaric acid-L-glutamic acid fermentation processes wherein carbohydrates are used as the starting material. This stems from the fact that the hydrocarbon starting material used in the present invention has a high carbon content per unit volume which forms the carbon structure of the product, compared with the conventional carbohydrate starting material. Moreover the air oxidation reaction with the genus of microorganisms employed in the present invention proceeds extremely efficiently.

As mentioned hereinabove, the present invention thus has many advantages, for example, the production of alpha-ketoglutaric acid in a remarkably high yield at low cost by the use of a hydrocarbon rather than a carbohydrate as a starting material, simple separation of the product from the fermentation liquor, etc. Therefore, the present invention provides an extremely advantageous industrial method of producing alpha-ketoglutaric acid.

As known in the art, alpha-ketoglutaric acid has utility in being a precursor in the biosynthesis of L-glutamic acid, the latter being widely used as a flavor enhancer in the form of its monosodium salt. Hence, in another embodiment of the present invention, a method for directly converting alpha-ketoglutaric acid, which is the main product produced by the above-mentioned strains of microorganisms, into L-glutamic acid has been developed.

When using saccharides as the starting material in producing L-glutamic acid by the processes of the prior art, it is advantageous to maintain the fermentation liquor at a pH of 6–9 by supplying ammonium ion as an amino radical source thereto, this being essential for the biosynthesis of L-glutamic acid. This measure is also effective in the process of the present invention, i.e., by carrying out such a step 30 to 50% of the alpha-ketoglutaric acid produced may be converted into L-glutamic acid.

However, the microorganisms capable of producing alpha-ketoglutaric acid with the use of hydrocarbons as the starting material have an oxidation capacity that is different from the microorganisms employed industrially for the production of L-glutamic acid. Therefore, the L-glutamic acid produced tends to oxidize to alpha-ketoglutaric acid.

Within the context of the present invention, the present inventors have found mutant strains of microorganisms which have little or no oxidation capacity for L-glutamic acid. Moreover, the present inventors have found that by properly inhibiting the decomposition of L-glutamic acid and appropriately supplying the essential amino radical source to the culture a direct conversion of more than 90% of the alpha-ketoglutaric acid produced into L-glutamic acid can be obtained.

In particular, the above results are achieved by (1) using adenine-required mutant strains of microorganisms which show little or no decomposition capacity for L-glutamic acid and by (2) conducting the fermentation in a culture medium containing a $C_4$ to $C_{12}$ primary and/or secondary monohydric alcohol, benzoic acid or compounds related thereto, polyhydric alcohols such as glycerol or the sugar alcohols, e.g., sorbitol, mannitol, etc., aromatic sulfonic acids such as sulfanilic acid, or mixtures thereof.

The mechanisms by which these substances make it possible to accomplish the above results has not been determined. Without being limited to any theory of action, it is believed that they inhibit the oxidation reaction and also act as a provider of amino radicals since many of the hydrocarbon-assimilatory bacteria belonging to the genus Arthrobacter produce amino acids such as aspartic acid, valine, glutamic acid, etc. by fermentation thereof with sorbitol or mannitol.

The process of the present invention employing bacteria belonging to the genus Arthrobacter having an assimilatory capacity for n-paraffins and a good productivity of alpha-ketoglutaric acid is most effective for producing alpha-ketoglutaric acid and L-glutamic acid when hydrocarbons, especially n-paraffins, are used as the starting material.

The following non-limiting experiments show in more detail the process of the present invention. Unless otherwise indicated, the percentages set forth therein are by weight.

Experiments were conducted using the following strains of bacteria:

*Arthrobacter simplex* ATCC No. 15799
*Arthrobacter roseoparaffinus* No. 1661 ATCC No. 15584
*Arthrobacter hydrocarboglutamincus* No. 2389 ATCC No. 15583
*Arthrobacter paraffineus* No. 2411 ATCC No. 15591
*Arthrobacter paraffineus* No. 851 ATCC No. 15590
*Arthrobacter paraffineus* No. 5601 ATCC No. 19065
*Arthrobacter paraffineus* No. 5888 ATCC No. 19064

The above-mentioned strains were used as seed bacteria and each was cultured with shaking in a culture medium containing 1.0% of kerosene, 0.2% of yeast extract, 1.0% of meat extract, 1.0% of peptone and 0.5% of NaCl at a pH of 7.2 at a temperature of 28° C. in a constant temperature chamber for 24 hours. Two ml. of each of these cultures was used in the fermentation medium. The composition of the fermentation medium was as follows:

(a) 5.0% of n-paraffin [1], 0.2% of $KH_2PO_4$, 0.1% of $MgSO_4 \cdot 7H_2O$, 0.005% of $MnSO_4 \cdot 4H_2O$, 2.0% of $NH_4NO_3$, 5 γ/l. of thiamine, 0.1 mγ/l. of vitamin $B_{12}$, 10γ/l. of paraaminobenzoic acid, 2 γ/l. of biotin, 0.005% of $FeSO_4 \cdot 7H_2O$, 0.01% of corn steep liquor, 3.0% of $CaCO_3$.

(b) 5.0% of n-paraffin [1], 0.2% of $KH_2PO_4$, 0.1% of $MgSO_4 \cdot 7H_2O$, 0.001% of $MnSO_4 \cdot 4H_2O$, 2.0% of $NH_4NO_3$, 0.001% of $FeSO_4 \cdot 7H_2O$, 0.01% of corn steep liquor, 2.0% of $CaCO_3$.

Culturing is conducted at 28° C. in 500 ml. Sakaguchi flasks each containing 20 ml. of the above-mentioned fermentation media. The culturing was carried out for four days with aerobic shaking.

Comparative results of growth and of the amount of produced alpha-ketoglutaric acid and L-glutamic acid by conducting the above fermentations are shown in Table 1.

TABLE 1

| STRAINS EMPLOYED | Growth | | Alpha-ketoglutaric acid | | L-glutamic acid | |
|---|---|---|---|---|---|---|
| | (a) | (b) | (a) g./dl. | (b) g./dl. | (a) g./dl. | (b)g./dl. |
| *Arthrobacter simplex* ATCC No. 15799 | +++++ | +++ | 1.5 | 1.0 | 0.2 | 0.1 |
| *Arthrobacter roseoparaffinus* No. 1661 ATCC No. 15584 | ++++ | ++ | 1.9 | 0.6 | 0.6 | 0.3 |
| *Arthrobacter hydrocarboglutamicus* No. 2389 ATCC No. 15583 | ++++ | +++ | 1.0 | 0.8 | 0.7 | 0.4 |
| *Arthrobacter paraffineus* No. 2411 ATCC No. 15591 | +++++ | +++ | 2.9 | 2.0 | 0.5 | 0.2 |
| *Arthrobacter paraffineus* No. 851 ATCC No. 15590 | +++++ | +++ | 2.5 | 1.5 | 0.4 | 0.2 |

As shown in Table 1, the presence of vitamins and n-organic salts, especially iron ion, in appropriate concentrations as constituents of the culture medium remarkably accelerates the growth of the bacteria and the production of alpha-ketoglutaric acid and L-glutamic acid. Furthermore, it should be noted that remarkable amounts of alpha-ketoglutaric acid are produced from n-paraffins by the use of the genus of microorganisms Arthobacter.

The method for converting the alpha-ketoglutaric acid fermentation to a predominant L-glutamic acid fermentation with the use of the Arthobacter genus is shown in the following experiments.

To accomplish this purpose, it is necessary to induce a reaction giving the amino group of L-glutamic acid from alpha-ketoglutaric acid while at the same time inhibiting the decomposition of the L-glutamic acid produced in order to have the fermentation produce predominantly L-glutamic acid.

Therefore, ammonium ion, which is essential as an amino group source in the synthesis of L-glutamic acid, was continuously supplied to the fermentation medium and the pH thereof was maintained at 7.0–8.2. This pH range is the optimum for the production of L-glutamic acid.

The pH adjustment of the fermentation medium and the supply of ammonium ion were accomplished by the addition of either an aqueous solution of urea, ammonia ---
[1] n-Paraffin: mixture containing 95% of $C_{11}$–$C_{18}$ n-paraffin.

water or an aqueous ammonium carbonate solution. The culturing method was the same as that described above in Table 1. The fermentation medium was that described as (a) in Table 1 above.

The results of these experiments are shown in Table 2.

TABLE 2

| | Alpha-ketoglutaric acid (g./dl.) | L-glutamic acid (g./dl.) |
|---|---|---|
| Arthrobacter simplex ATCC No. 15799 | 1.0 | 0.8 |
| Arthrobacter paraffineus No. 2411 ATCC No. 15591 | 1.0 | 1.3 |
| Arthrobacter paraffineus No. 851 ATCC No. 15590 | 1.2 | 1.0 |
| Arthrobacter paraffineus No. 2367 | 1.0 | 1.5 |

As shown in Table 2, the amount of L-glutamic acid is increased while that of alpha-ketoglutaric acid is decreased by the above-mentioned pH adjustment and by the supply of ammonium ion to the fermentation medium. Thus, it may be concluded that the supply of ammonium ion and the described pH adjustment are essential for obtaining a high production amount of L-glutamic acid.

However, it was noted by the present inventors that large amounts of alpha-ketoglutaric acid were still accumulated and that the L-glutamic acid tended to decompose during the last stages of the culturing. Therefore, in order to resolve these remaining problems, the following experiments were carried out wherein substances for promoting the production of L-glutamic acid were employed. The culturing was conducted in accordance with the method discussed in connection with Table 2. The results thereof are summarized in Table 3.

TABLE 3

| Test strains | Substance added | Concentration of added substance (percent) | Alpha-ketoglutaric acid (g./dl.) | L-glutamic acid (g./dl.) |
|---|---|---|---|---|
| Arthrobacter paraffineus No. 2411 ATCC No. 15591. | None | | 1.2 | 1.0 |
| Do | Sorbitol | 1.0 | 0.6 | 1.9 |
| Do | do | 2.0 | 0.5 | 2.3 |
| Do | Mannitol | 1.0 | 0.3 | 2.0 |
| Do | do | 2.0 | 0.4 | 2.8 |
| Do | Glycerol | 1.0 | 0.9 | 1.6 |
| Do | do | 2.0 | 0.5 | 1.7 |
| Do | Butanol | 1.0 | 0.7 | 1.8 |
| Do | do | 2.0 | 0.5 | 2.0 |
| Do | Octanol | 0.5 | 0.3 | 2.5 |
| Do | do | 1.0 | 0.2 | 2.5 |
| Do | Benzoic acid | 0.1 | 0.8 | 1.7 |
| Do | Sulfanilic acid | 0.02 | 0.5 | 1.5 |
| Arthrobacter paraffineus No. 5888 ATCC No. 19064. | Adenine [1] | 0.01 | 0.2 | 2.0 |
| Arthrobacter paraffineus No. 5601 ATCC No. 19065. | None [2] | | 0.3 | 2.5 |

[1] Adenine requiring mutant strain.
[2] Mutant strain (having weak decomposition capacity for L-glutamic acid).

As shown in Table 3, sugar alcohols, higher monohydric alcohols, glycerol, benzoic acid and compounds related thereto, and aromatic sulfonic acids are effective substances for promoting the production of L-glutamic acid by fermentation. Furthermore, it was found that adenine-requisite mutant strains and mutant strains having a weak decomposition capacity for L-glutamic acid produce hardly any alpha ketoglutaric acid and directly accumulate remarkably large amounts of L-glutamic acid in the culture liquor.

Hence, the present invention involves several facets. One of these is the discovery that large amounts of alpha-ketoglutaric acid and L-glutamic acid are produced in the culture liquor with the use of microorganisms belonging to the genus Arthrobacter wherein n-paraffins having from 11 to 18 carbon atoms are used as the starting material. Another is the discovery that a production method which is extremely advantageous on an industrial scale has been found whereby the predominant product of the fermentation may be converted to alpha-ketoglutaric acid or L-glutamic acid, respectively, as desired.

Either a single n-paraffin having from 11 to 18 carbon atoms, or a mixture of more than one of these n-paraffins may be employed in the process of the present invention. Furthermore, a mixture of one or more than one of these n-paraffins with another carbon source wherein the n-paraffin is the major constituent may be used. Normal-paraffins within the above-mentioned carbon-number range include n-undecane, n-dodecane, n-tridecane, n-tetradecane, n-pentadecane, n-hexadecane, n-heptadecane, and n-octadecane and mixtures thereof.

Details of culturing are conventional and well-known to those skilled in the art. For example, other carbon sources which may be utilized in minor amounts include carbohydrates, e.g., glucose, starch hydrolysate, molasses, etc., or other conventional carbon sources. Inorganic salts which may be employed include potassium phosphate, magnesium sulfate, manganese sulfate, potassium chloride, ferrous sulfate, calcium carbonate, etc. Conventional sources of nitrogen which may be employed include yeast extract, peptone, fish meal, etc. As mentioned above, various essential nutrients may be added to the medium.

The n-paraffins may be added to the medium in the amount of from about 5% to 15% by weight. The fermentation is preferably carried out at a culture temperature of from 25° to 38° C.

After completion of the fermentation process, the L-glutamic acid and/or alpha-ketoglutaric acid may be recovered by conventional methods, such as with an ion exchange resin or by centrifugation.

The following examples are given merely as illustrative of the present invention and are not to be considered as limiting. Unless otherwise indicated, the percentages set forth therein are by weight.

Example 1

Three liters of a culture medium containing 0.2% of $K_2HPO_4$, 0.1% of $MgSO_4 \cdot 7H_2O$, 0.002% of $MnSO_4 \cdot 4H_2O$, 0.02% of $FeSO_4 \cdot 7H_2O$, 2.0% of $NH_4NO_3$, 3γ/l. of thiamine, 0.1 mγ/ml. of vitamin $B_{12}$, 0.01% of corn steep liquor and 3.0% of $CaCO_3$ was sterilized at a pH of 7.2 in a 5 liter jar fermenter. Then, 200 grams of a mixture of $C_{11}$-$C_{18}$ n-paraffins ($C_{11}$: 7.0%, $C_{12}$: 30%, $C_{13}$: 25%, $C_{14}$: 24%, $C_{15}$: 10%, $C_{16}$: 1.5%) was added thereto. A seed culture liquor of Arthrobacter paraffineus No. 2411, ATCC No. 15591, previously incubated by means of a shaking culture in bouillon medium for 24 hours, was then inoculated thereinto in the amount of 10%. Culturing was then carried out for 96 hours with stirring at 600 r.p.m. while ventilating with germ-free air at the rate of 1 liter per minute at 28° C. At the completion of the culturing, the accumulated amounts of α-ketoglutaric acid and L-glutamic acid were 43 g./l. and 6 g./l. respectively.

Crystals of alpha-ketoglutaric acid (100 grams) and of L-glutamic acid (15 grams) were obtained from 3 liters of the said fermentation liquor by means of conventional methods.

Example 2

*Arthrobacter simplex* ATCC No. 15799 was cultured in the same manner as was described in Example 1. After 96 hours of culturing, 18 g./l. of alpha-ketoglutaric acid and 1 g./l. of L-glutamic acid were obtained.

Example 3

The same culture as described in Example 1 was conducted but wherein the fermentation liquor was adjusted to a pH of 7.0–7.5 continuously by supplying ammonia water thereto.

After 72 hours of culturing, 20 g./l. of L-glutamic acid and 20 g./l. of alpha-ketoglutaric acid were accumulated in the culture liquor.

Example 4

*Arthrobacter paraffineus* No. 5601 (ATCC No. 19065) was cultured the same as described in Example 3. After 72 hours of culturing, 35 g./l. of L-glutamic acid and 3 g./l. of alpha-ketoglutaric acid were accumulated.

Example 5

Culturing was carried out in the same way as described in Example 3 except that octanol was also added to the culture medium in the amount 1.0% at the beginning of the culture. After 96 hours of culturing, 30 g./l. of L-glutamic acid and 6 g./l. of alpha-ketoglutaric acid were accumulated.

Example 6

The culture was conducted the same as in Example 3 in a culture medium also containing 2.0% of mannitol. After 96 hours of culturing, 39 g./l. of L-glutamic acid and 8 g./l. of alpha-ketoglutaric acid were produced.

Example 7

*Arthrobacter paraffineus* No. 5888 (ATCC No. 19064) was inoculated into 20 ml. of a culture medium containing 0.1% of $KH_2PO_4$, 0.1% of $NaHPO_4 \cdot 12H_2O$, 0.1% of $MgSO_4 \cdot 7H_2O$, 0.002% of $FeSO_4 \cdot 7H_2O$, $5\gamma$/l. of thiamine, 2.0% of $(NH_4)_2SO_4$, 0.03% of corn steep liquor, $100\gamma$/ml. of adenine and 5.0% of n-dodecane at a pH of 7.0 in a 500 ml. Sakaguchi flask and the mixture was cultured with shaking for 96 hours at 30° C. The pH was adjusted to about 7.0–8.0 by adding urea solution and ammonia water to the culture liquor. At the completion of culturing, 20 mg./ml. of L-glutamic acid and 3 mg./ml. of alpha-ketoglutaric acid were accumulated in the culture liquor.

In accordance with the present invention, the substances to be added to the fermentation medium for increasing the yield of L-glutamic acid, if desired, by the conversion of alpha-ketoglutaric acid include, as mentioned hereinabove, aliphatic alcohols, i.e., the sugar alcohols, glycerol and primary or secondary monohydric alcohols containing from 4 to 12 carbon atoms, benzoic acid, sulfanilic acid, and mixtures of these substances. The sugar alcohols are well-known in the art and include compounds such as sorbitol, mannitol, galactitol, etc. The primary or secondary monohydric alcohols which may be employed include, for example, 1-butanol, 2-butanol, 2-methyl-1-propanol, 1-pentanol, 2-pentanol, 1-hexanol, 2-hexanol, 1-heptanol, 2-heptanol, 1-octanol, 2-octanol, 1-dodecanol, etc., i.e., the primary and secondary monohydric alcohols containing from 4 to 12 carbon atoms. These substances may be added to the fermentation medium in the amount of about 0.01% to 2.0% by weight.

The microorganism *Arthrobacter simplex* is known in the art and is described in Bergey's Manual of Determinative Bacteriology, 7th edition (1957). *Arthrobacter roseoparaffinus* and *Arthrobacter hydrocarboglutamicus* are novel strains of microorganisms and are described in copending application Ser. No. 478,725, filed Aug. 10, 1965, and assigned to the assignee of the present invention. The *Arthrobacter paraffineus* strains are also novel strains of microorganisms and are described in, for example, U.S. application Ser. No. 470,883 filed on July 9, 1965, now abandoned.

The invention being thus described, it will be obvious that the same may be varied in many ways. Such variations are not to be regarded as a departure from the spirit and scope of the invention and all such modifications are intended to be included within the scope of the following claims.

What we claim is:

1. A process for producing alpha-ketoglutaric acid and L-glutamic acid which comprises culturing a microorganism belonging to the genus Arthrobacter under aerobic conditions in an aqueous nutrient medium containing at least one normal-paraffin as the major source of carbon, and recovering the alpha-ketoglutaric acid and L-glutamic acid thus produced.

2. The process of claim 1, wherein said normal-paraffin contains from 11 to 18 carbon atoms.

3. The process of claim 1, wherein the pH is maintained at from 7.0 to 8.2 by adding ammonium ion to said medium in order to increase the yield of L-glutamic acid produced.

4. The process of claim 3, wherein an aqueous solution of a compound selected from the group consisting of urea, ammonia and ammonium carbonate is added to said medium as the source of said ammonium ion.

5. The process for producing alpha-ketoglutaric acid and L-glutamic acid which comprises culturing a microorganism belonging to the genus Arthrobacter under aerobic conditions in an aqueous nutrient medium containing at least one normal-paraffin as the major source of carbon, a source of nitrogen, inorganic salts including at least a supply of iron ion to said medium and a source of growth-promoting factors which supplies at least biotin, thiamine and vitamin $B_{12}$ to said medium, and recovering the alpha-ketoglutaric acid and L-glutamic acid thus produced.

6. The process of claim 5, wherein calcium carbonate is added to said medium.

7. The process of claim 6, wherein para-aminobenzoic acid is added to said medium.

8. The process of claim 5, wherein said normal-paraffin contain from 11 to 18 carbon atoms.

9. The process of claim 5, wherein the pH is maintained at from 7.0 to 8.2 by adding ammonium ion to said medium in order to increase the yield of L-glutamic acid produced.

10. The process of claim 5, wherein an aqueous solution of a compound selected from the group consisting of urea, ammonia and ammonium carbonate is added to said medium as the source of said ammonium ion.

11. The process of claim 5, wherein said microorganism is selected from the group consisting of *Arthrobacter simplex*, *Arthrobacter roseoparaffinus*, *Arthrobacter hydrocarboglutamicus* and *Arthrobacter paraffineus*.

12. A process for producing alpha-ketoglutaric acid and L-glutamic acid wherein a predominant amount of L-glutamic acid is produced by conversion of said alpha-ketoglutaric acid to said L-glutamic acid which comprises culturing a microorganism belonging to the genus Arthrobacter under aerobic conditions in an aqueous nutrient medium containing at least one normal-paraffin as the major source of carbon in the presence of a substance selected from the group consisting of aliphatic alcohols, benzoic acid, sulfanilic acid and mixtures thereof, and recovering the L-glutamic acid and alpha-ketoglutaric acid thus produced.

13. The process of claim 12, wherein said normal-paraffin contains from 11 to 18 carbon atoms.

14. The process of claim 12, wherein said aliphatic alcohols are selected from the group consisting of the sugar alcohols, glycerol and primary and secondary monohydric alcohols containing from 4 to 12 carbon atoms.

15. The process of claim 14, wherein the sugar alcohol is sorbitol.

16. The process of claim 14, wherein the sugar alcohol is mannitol.

17. A process for producing alpha-ketoglutaric acid and L-glutamic acid wherein a predominant amount of L-glutamic acid is produced by conversion of said alpha-ketoglutaric acid to said L-glutamic acid which comprises culturing a microorganism belonging to the genus Arthrobacter under aerobic conditions in an aqueous nutrient medium containing at least one normal-paraffin as the major source of carbon, a source of nitrogen, inorganic salts including at least a supply of iron ion to said medium and a source of growth-promoting factors which supplied at least biotin, thiamine and vitamin $B_{12}$ to said medium in the presence of a substance selected from the group consisting of aliphatic alcohols, benzoic acid, sulfanilic acid and mixtures thereof, and recovering the L-glutamic acid and alpha-ketoglutaric acid thus produced.

18. The process of claim 17, wherein said normal-paraffin contains from 11 to 18 carbon atoms.

19. The process of claim 17, wherein said aliphatic alcohols are selected from the group consisting of the sugar alcohols, glycerol and primary and secondary monohydric alcohols containing from 4 to 12 carbon atoms.

20. The process of claim 12, wherein said microorganism is a mutant strain of Arthrobacter requiring adenine for its growth and wherein adenine is added to said medium.

21. The process of claim 20, wherein said microorganism is *Arthrobacter paraffineus* No. 5888. (ATCC No. 19064)

22. The process of claim 17, wherein said microorganism is a mutant strain of Arthrobacter having only a weak capacity for decomposing L-glutamic acid.

23. The process of claim 22, wherein said microorganism is *Arthrobacter paraffineus* No. 5601 (ATCC No. 19065).

24. The process of claim 22, wherein calcium carbonate is added to said medium.

25. The process of claim 24, wherein para-aminobenzoic acid is added to said medium.

References Cited

UNITED STATES PATENTS

| 3,120,472 | 4/1964 | Dunn et al. | 195—47 |
| 3,212,944 | 10/1965 | Kono et al. | 195—29 |
| 3,222,258 | 12/1965 | Iizuka et al. | 195—29 |

OTHER REFERENCES

Shiio et al., Journal of Applied Microbiology, vol. 9, No. 1, pp. 23–30.

LIONEL M. SHAPIRO, *Primary Examiner.*

U.S. Cl. X.R.

195—29, 30